United States Patent
Kurczveil et al.

(10) Patent No.: US 9,927,572 B1
(45) Date of Patent: Mar. 27, 2018

(54) HYBRID PHOTONIC DEVICE STRUCTURES

(71) Applicant: HEWLETT PACKARD ENTERPRISE DEVELOPMENT LP, Houston, TX (US)

(72) Inventors: Geza Kurczveil, Palo Alto, CA (US); Di Liang, Santa Barbara, CA (US); Zhihong Huang, Palo Alto, CA (US); Raymond G Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/397,903

(22) Filed: Jan. 4, 2017

(51) Int. Cl.
G02B 6/12 (2006.01)

(52) U.S. Cl.
CPC ..... *G02B 6/12004* (2013.01); *G02B 6/12002* (2013.01); *G02B 2006/12061* (2013.01); *G02B 2006/12121* (2013.01); *G02B 2006/12123* (2013.01)

(58) Field of Classification Search
CPC ............ G02B 6/12002; G02B 6/12004; G02B 2006/12061; G02B 2006/12121; G02B 2006/12123; H01L 21/20; H01L 21/2018; H01L 21/2022; H01L 21/02532
See application file for complete search history.

(56) References Cited

U.S. PATENT DOCUMENTS

| | | | |
|---|---|---|---|
| 8,257,997 B2 | 9/2012 | Chen | |
| 8,652,951 B2 | 2/2014 | Huang | |
| 8,741,684 B2 | 6/2014 | Bogaerts | |
| 9,368,579 B2* | 6/2016 | Balram | H01L 21/02381 |
| 2010/0006961 A1 | 1/2010 | Yasaitis | |
| 2010/0078680 A1* | 4/2010 | Cheng | H01L 21/02532 257/184 |
| 2014/0231946 A1* | 8/2014 | Kang | H01L 31/107 257/432 |
| 2015/0130017 A1* | 5/2015 | Han | H01L 21/02455 257/522 |

OTHER PUBLICATIONS

Hyun-Yong Yu, "Selective-Area High-Quality Germanium Growth for Monolithic Integrated Optoelectronics," Mar. 2, 2012, 3 pps., <http://ieeexplore.ieee.org/document/6163345/>.
Jifeng Liu, "Monolithically Integrated Ge-on-Si Active Photonics," Jul. 2, 2014, 36 pps. <https://www.google.co.in/url?sa=t&rct=j&q=&esrc=s&source=web&cd=8&cad=rja&uact=&&ved=GahUKEwj7zfTTxsXPAhXMHZQKHTBCCBYQFghXMAg&url=http%3A%2F%2Fwww.mdpi.com%2F2304-6732%2F1%2F3%2F162%Fpdf&usg=AFQjONHT0_JF5bD5mX7PlOm4NxiocrjTriw8=R0mmBxjHcC58UI7nEA2Njw&bvm=bv 134495766.d.dGo>.

* cited by examiner

*Primary Examiner* — Rhonda Peace
(74) *Attorney, Agent, or Firm* — Hewlett Packard Enterprise Patent Department (57) ABSTRACT

Examples include hybrid silicon photonic device structures. Some examples include a method of integrating a photodetector with a photonic device on a silicon wafer to make a hybrid silicon photonic device structure. A dielectric layer is established on the silicon wafer. A pit is formed in a portion of the dielectric layer and the silicon wafer, wherein a bottom of the pit is silicon. A germanium layer is grown in the pit such that a top of the germanium layer is lower than a top of the silicon wafer. The germanium layer comprises the photodetector. A photonic device material that comprises the photonic device is bonded to the silicon wafer without planarization of the silicon wafer.

20 Claims, 6 Drawing Sheets

HYBRID PHOTONIC DEVICE STRUCTURES

STATEMENT OF GOVERNMENT INTEREST

This invention was made with government support under Contract No. H98230-12-C-0236, awarded by Maryland Procurement Office. The government has certain rights in the invention.

BACKGROUND

Photodetectors and photonic devices such as lasers or modulators are often used together in a wide variety of applications in which optical communication links may be useful. In some instances, photodetectors and photonic devices may be integrated on a single substrate. Integration may improve the performance and quality of the photodetectors and photonic devices and may decrease overall size and cost.

BRIEF DESCRIPTION OF THE DRAWINGS

The following detailed description references the drawings, wherein.

DETAILED DESCRIPTION

Photodetectors and photonic devices may be integrated in a hybrid silicon photonic device structure. A photodetector, as used herein, may refer to a device used for the detection of light. In some examples, a photodetector may respond to or detect a narrow range of optical wavelengths. In other examples, a photodetector may have high responsivity, detecting a wide range of optical wavelengths. A photonic device, as used herein, may refer to a device used to create or manipulate light. Example photonic devices include lasers, amplifiers, modulators, resonators, waveguides, and the like. The photonic device may be bonded to a silicon wafer that includes a photodetector to form a hybrid silicon photonic device structure or may be formed in the silicon itself.

Some methods of integrating a photodetector and a photonic device on a same silicon wafer involve forming the photodetector on the silicon wafer by growing germanium. Subsequently, the photonic device is bonded to the silicon wafer. Bonding after germanium growth may be difficult, however, as bonding may entail a smooth and planar surface and germanium growth may result in a rough and nonplanar surface. In some examples, the surface of the silicon wafer may be planarized after germanium growth and prior to bonding. Selective area bonding may also be used to integrate photonic devices on the silicon wafer. Such approaches may be time-consuming, resource-intensive, and costly. For instance, planarization involves an additional step that may add time and cost. Selective area bonding involves the careful alignment of the photonic device with the photo detector, adding complexity. Moreover, in a single silicon wafer having multiple photodetectors and photonic devices, multiple alignments may be required, adding additional complexity, time, and resources.

Examples described herein may improve integration of photodetectors and photonic devices on a silicon wafer by selectively growing germanium such that a photonic device material may be bonded to the silicon wafer without planarization. In some examples described herein, the silicon wafer includes a plurality of photodetectors, the photonic device material comprises a plurality of photonic devices such that each photodetector has a corresponding photonic device, and the photonic device material is bonded with a single alignment.

In some examples described herein, a method of integrating a photodetector with a photonic device on a silicon wafer to make a hybrid silicon photonic device structure comprises the establishment of a dielectric layer on the silicon wafer. A pit may be formed in a portion of the dielectric layer and the silicon wafer, wherein a bottom of the pit is silicon. Germanium may be grown in the pit such that a top of the germanium layer is lower than a top of the silicon wafer. The germanium layer comprises the photodetector. A photonic device material that comprises the photonic device may be bonded to the silicon wafer without planarization of the silicon wafer.

In some such examples described herein, bonding the photonic device material may comprise molecular bonding or polymer bonding. In such examples, the silicon wafer may include a plurality of photodetectors and the photonic device material may comprise a plurality of photonic devices such that each photodetector of the plurality of photodetectors corresponds to a photonic device of the plurality of photonic devices. The photonic device material may be bonded with a single alignment.

In some examples described herein, a hybrid silicon photonic device structure that integrates a photodetector and a photonic device on a silicon wafer comprises a silicon base layer, a silicon dioxide middle layer on top of the silicon base layer, and a silicon top layer on top of the silicon dioxide middle layer, the silicon top layer having a pit. A bottom of the pit is silicon and a germanium layer that comprises the photodetector is on top of the bottom of the pit. The germanium layer is grown such that a top of the germanium layer is lower than the silicon top layer. The hybrid silicon photonic device structure further comprises a photonic device material that comprises the photonic device, wherein the photonic device material is bonded to the silicon top layer without planarization of the silicon top layer.

In some examples described herein, a hybrid silicon photonic device structure that integrates a photodetector and a photonic device on a silicon wafer comprises a silicon layer having a pit. A bottom of the pit is silicon. A germanium layer that comprises the photodetector is on top of the bottom of the pit. The germanium layer is grown such that a top of the germanium layer is lower than a top of the silicon layer. The hybrid silicon photonic device structure further comprises the photonic device, wherein the photonic device is fabricated in the silicon layer without planarization of the silicon layer.

In some such examples, the hybrid silicon photonic device structure further comprises a photonic device material that comprises a second photonic device. The photonic device material is bonded to the silicon layer without planarization of the silicon layer.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to.

Figure 1:
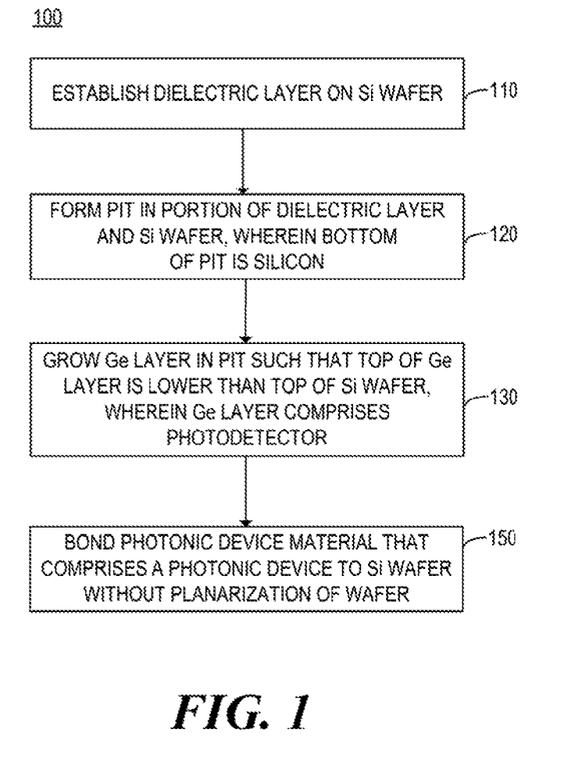
FIG. 1 is a flowchart of an example method of integrating a photodetector with a photonic device on a silicon wafer.

Referring now to the drawings, FIG. 1 is a flow chart of an example method 100 of integrating a photodetector with a photonic device on a silicon wafer to make a hybrid silicon photonic device structure. Execution of method 100 is generally described below with reference to hybrid silicon photonic device structure 400 of FIG. 4. Implementation of method 100 is not limited to such an example however (e.g., hybrid silicon photonic device structure 500 of FIG. 5, etc.).

A photodetector, as used herein, may refer to a device used for the detection of light. In some examples, a photodetector may respond to or detect a narrow range of optical wavelengths. In other examples, a photodetector may have high responsivity, detecting a wide range of optical wavelengths. As used herein, a photonic device may refer to a device used to create or manipulate light other than a photodetector. Example photonic devices include lasers, amplifiers, modulators, resonators, waveguides, and the like.

Photonic devices may be active or passive. A passive photonic device, as used herein, may refer to a photonic device in which there is no interaction between electrons and photons. Examples include photonic devices in undoped silicon structures such as gratings, ring resonators, and the like. An active photonic device, as used herein, may refer to a photonic device in which interaction exists between electrons and photons. Active photonic devices may have electrical terminals or conduction points at which a voltage and/or current may be applied to allow for light to be manipulated. Examples include ring modulators in doped silicon structures and lasers, modulators, resonators, and the like in group III-V semiconductor materials.

Figure 4:
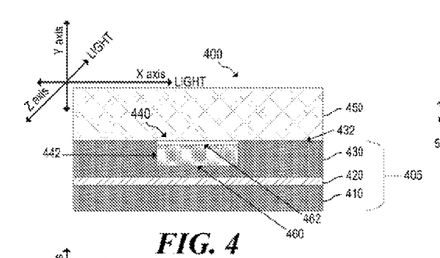
FIGS. 4-7 are block diagrams of cross-sectional views of example hybrid silicon photonic device structures that integrate a photodetector and a photonic device on a silicon wafer.

A hybrid silicon photonic device structure, as used herein, refers to a photodetector and a photonic device integrated on a single silicon wafer. A silicon wafer, as used herein, is a thin slice or substrate of silicon (Si) material. As depicted in FIG. 4, hybrid silicon photonic device structure 400 may comprise a silicon wafer 405. In some examples, silicon wafer 405 may further comprise a silicon base layer 410, a silicon dioxide (SiO$_2$) middle layer 420, and a silicon top layer 430, as shown.

At 110 of FIG. 1, a dielectric layer may be established on the silicon wafer. A dielectric layer, as used herein, refers to a layer of an electrical insulator that can be polarized by an applied electric field. In some examples, the dielectric layer may comprise silicon dioxide, silicon nitride (Si$_3$N$_4$), or the like. The dielectric layer may be grown, deposited, or established via any suitable establishment process on the top of silicon wafer 405. In an example including a silicon base layer 410, a silicon dioxide middle layer 420, and a silicon top layer 430, the dielectric layer would be established on silicon top layer 430.

Figure 7:
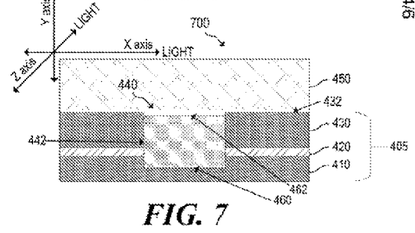

At 120 of FIG. 1, a pit 440 is formed in a portion of the dielectric layer and silicon wafer 405. The pit may be formed via etching, mechanical removal, or any other suitable formation process that forms a pit. Pit 440 may be formed in silicon top layer 430 such that a bottom 460 of pit 440 is silicon. In other examples, as shown in FIG. 7, pit 440 may be formed in silicon top layer 430 and extend through silicon dioxide middle layer 420 to silicon base layer 410 such that bottom 460 of pit 440 is in silicon base layer 410. Bottom 460 of pit 440 being in silicon may provide a silicon seed layer for growth of additional layers within pit 440.

Referring again to FIG. 1, at 130, a germanium (Ge) layer 442 is grown in pit 440. Germanium layer 442 is grown such that a top 462 of the germanium layer is lower than a top 432 of silicon wafer 405. The germanium layer comprises the photodetector. The photodetector may, in some examples, include the germanium layer, additional layers, and/or additional components. In some examples, growing the germanium layer may further comprise method 230 of FIG. 2, as described below.

At 150 of FIG. 1, a photonic device material may be bonded to the silicon wafer without planarization of the silicon wafer. Planarization of the silicon wafer may refer to a mechanical grinding or chemical etch of the silicon wafer to remove upraised portions on the surface of the silicon wafer (e.g., hills or bumps caused by deposition, etc.) to provide a smooth surface for bonding. In the example of FIG. 1, the photonic device material may be bonded to the silicon wafer without planarization given that the germanium layer does not create any bumps or ridges on the surface of the silicon wafer. Depressions or dips in the silicon wafer, such as pit 440, may not impede bonding of the photonic device material.

As shown in FIG. 4, photonic device material 450 may be bonded to top 432 of silicon wafer 405. The photonic device material comprises the photonic device. In some examples, the photonic device may be a laser, modulator, or other suitable photonic device. Light may traverse the hybrid silicon photonic device structure 400 in a lateral direction along the x axis or along the z axis, as shown by the arrows labeled "light". Bonding of the photonic device material may, in some examples, comprise molecular bonding or polymer bonding.

Prior to the bonding of the photonic device material, in some examples, the dielectric layer may be removed. The dielectric layer may be removed via any suitable removal process, including chemical etching of the dielectric layer, mechanical grinding of the dielectric layer, and the like. In other examples, the dielectric layer may be unaltered prior to the bonding of the photonic device material. In such examples, bonding the photonic device material to the dielectric layer may be considered bonding the photonic device material to the silicon wafer.

Although the flowchart of FIG. 1 shows a specific order of performance of certain functionalities, method 100 may not be limited to that order. For example, the functionalities shown in succession in the flowchart may be performed in a different order, may be executed concurrently or with partial concurrence, or a combination thereof. In some examples, functionalities described herein in relation to FIG. 1 may be provided in combination with functionalities described herein in relation to any of FIGS. 2-10.

Figure 2:
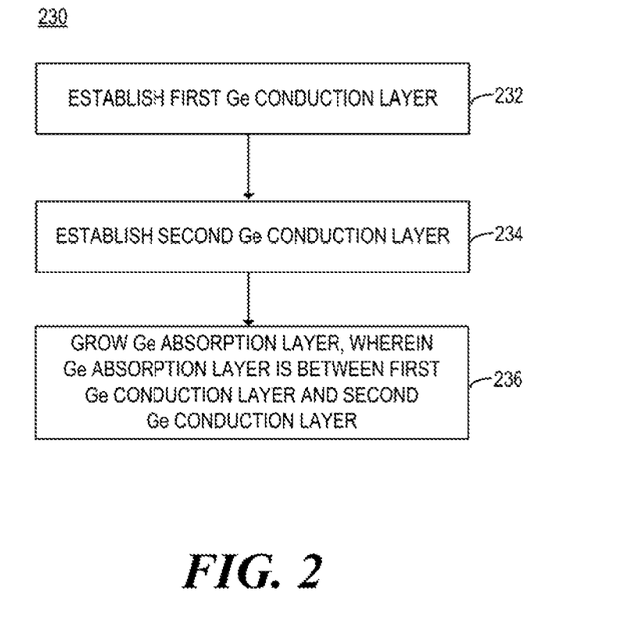
FIG. 2 is a flowchart of an example method of growing a germanium layer that comprises a photodetector.

FIG. 2 is a flow chart of an example method 230 of growing a germanium layer, as described above in relation to 130 of FIG. 1. In such examples, germanium layer 442 may include a first germanium conduction layer, a second germanium conduction layer, and a germanium absorption layer. Execution of method 230 is generally described below with reference to hybrid silicon photonic device structure 600 of FIG. 6. Implementation of method 230 is not limited to such an example however.

Figure 6:
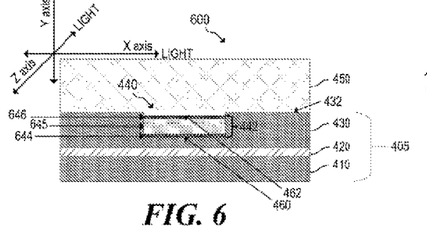

At 232 of FIG. 2, a first germanium conduction layer may be established. As shown in FIG. 6, first germanium conduction layer 644 may be established at bottom 460 of pit 440. In some examples, first germanium conduction layer 644 may be established by growing germanium and subsequently doping the germanium to produce the conduction layer. In other examples, doped germanium may be deposited or grown to produce the conduction layer. First germanium conduction layer 644 may comprise a p-type conduction layer that conducts positive charge carriers or may comprise an n-type conduction layer that conducts negative charge carriers.

At 234 of FIG. 2, a second germanium conduction layer may be established. As shown in FIG. 6, second germanium conduction layer 646 may be established at top 462 of pit 440. Like first germanium conduction layer 644, second germanium conduction layer 646 may be established by growing germanium and subsequently doping the germanium to produce the conduction layer. Second germanium conduction layer 646 may also be established by depositing or growing doped germanium to produce the conduction layer. Second germanium conduction layer 646 may comprise either a p-type conduction layer that conducts positive charge carriers or an n-type conduction layer that conducts negative charge carriers, depending on the first germanium conduction layer 644.

First and second germanium conduction layers 644 and 646 may comprise differing types of conduction layers. For instance, if first germanium conduction layer 644 is a p-type conduction layer, second germanium conduction layer 646 may be an n-type conduction layer, or vice versa.

At 236 of FIG. 2, a germanium absorption layer 645 may be grown between first germanium conduction layer 644 and second germanium conduction layer 646. In such examples, germanium absorption layer 645 may be grown after first germanium conduction layer 644 has been established and before the establishment of second germanium conduction layer 646. In other examples, germanium layer 442 may be grown in stages and portions of germanium layer 442 may be doped to establish the first and second germanium conduction layers 644 and 646, leaving the undoped portion as the germanium absorption layer 645. Other suitable implementations for growing germanium absorption layer 645 between the first and second germanium conduction layers 644 and 646 may be used.

Although the flowchart of FIG. 2 shows a specific order of performance of certain functionalities, method 230 may not be limited to that order. For example, the functionalities shown in succession in the flowchart may be performed in a different order, may be executed concurrently or with partial concurrence, or a combination thereof. In some examples, functionalities described herein in relation to FIG. 2 may be provided in combination with functionalities described herein in relation to any of FIGS. 1 and 3-10.

Figure 3:
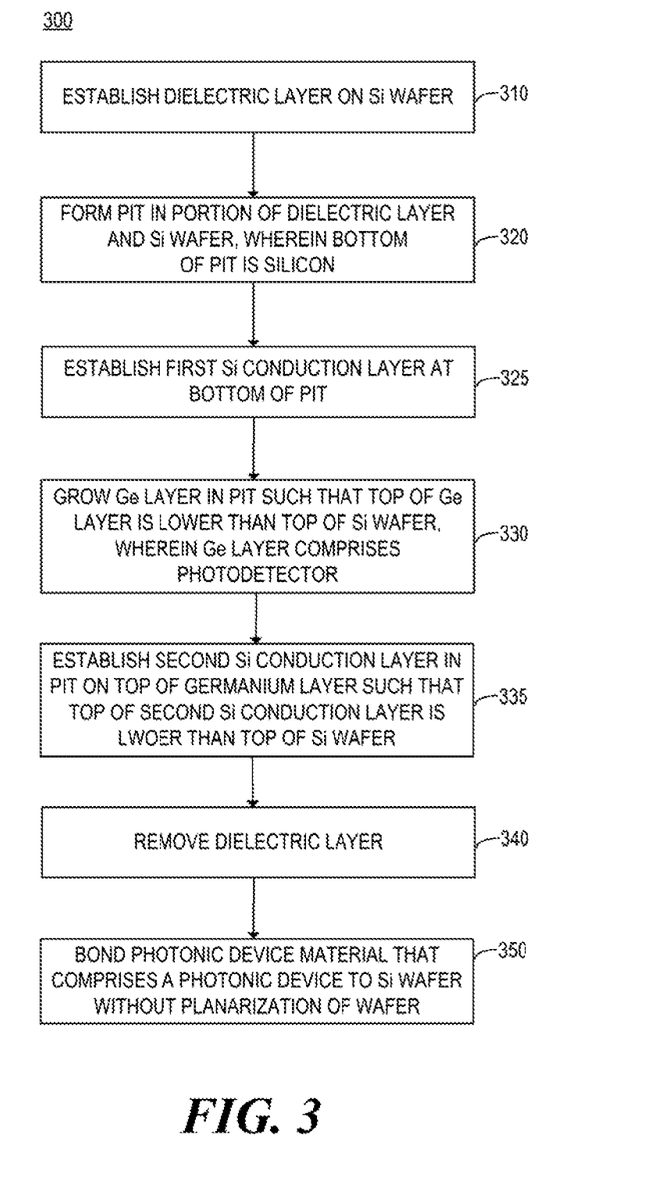
FIG. 3 is a flowchart of an example method of integrating a photodetector with a photonic device on a silicon wafer that includes silicon conduction layers.

Further examples are described in relation to FIG. 3. FIG. 3 is a flow chart of an example method 300 of integrating a photodetector with a photonic device on a silicon wafer to make a hybrid silicon photonic device structure. Execution of method 300 is generally described below with reference to hybrid silicon photonic device structure 500 of FIG. 5. Implementation of method 300 is not limited to such an example however (e.g., hybrid silicon photonic device structure 300 of FIG. 4, etc.).

At 310 of FIG. 3, a dielectric layer may be established on the silicon wafer, as described above in relation to 110 of FIG. 1. At 320, a pit 440 is formed in a portion of the dielectric layer and silicon wafer 405, as described above in relation to 120 of FIG. 1. Pit 440 may be formed in silicon top layer 430 such that bottom 460 of pit 440 is silicon.

Figure 5:
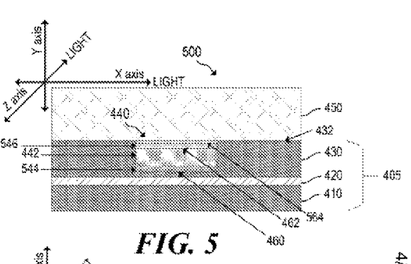

At 325, a first silicon conduction layer 544 may be established. As shown in FIG. 5, first silicon conduction layer 544 may be established at bottom 460 of pit 440. In some examples, first silicon conduction layer 544 may be established by growing silicon and subsequently doping the silicon to produce the conduction layer. In other examples, doped silicon may be deposited or grown to produce the conduction layer. First silicon conduction layer 544 may comprise a p-type conduction layer that conducts positive charge carriers or may comprise an n-type conduction layer that conducts negative charge carriers.

At 330, a germanium layer 442 is grown in pit 440, as described above in relation to 130 of FIG. 1. As shown in the example of FIG. 5, germanium layer 442 may be located above first silicon conduction layer 544 within pit 440. At 335, a second silicon conduction layer 546 may be established in pit 440 on top of germanium layer 442. A top 564 of second silicon conduction layer 546 is lower than top 432 of silicon wafer 405. In some examples, second silicon conduction layer 546 may be established by growing silicon and subsequently doping the silicon to produce the conduction layer. In other examples, doped silicon may be deposited or grown to produce the conduction layer. Second silicon conduction layer 546 may comprise either a p-type conduction layer that conducts positive charge carriers or an n-type conduction layer that conducts negative charge carriers, depending on first silicon conduction layer 544.

First and second silicon conduction layers 544 and 546 may comprise differing types of conduction layers. For instance, if first silicon conduction layer 544 is a p-type conduction layer, second silicon conduction layer 546 may be an n-type conduction layer, or vice versa.

At 340, the dielectric layer may be removed via any suitable removal process, as described above in relation to FIG. 1. At 350, photonic device material may be bonded to the silicon wafer without planarization of the silicon wafer, as described above in relation to 150 of FIG. 1.

In some examples, prior to establishing a dielectric layer on the silicon wafer at 310, a photonic device may be fabricated in the silicon wafer. In such examples, the photonic device may be passive and fabricated in silicon top layer 430. Accordingly, the hybrid photonic device structure may include both a passive photonic device and an active photonic device, as discussed in more detail in relation to FIG. 9, below.

Although the flowchart of FIG. 3 shows a specific order of performance of certain functionalities, method 300 may not be limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4-10.

FIGS. 4-7 depict cross-sectional views of example hybrid silicon photonic device structures 400, 500, 600, and 700 that may be produced via the methods described above. As shown in FIG. 4, hybrid silicon photonic device structure 400 integrates a photodetector and a photonic device on silicon wafer 405. Hybrid silicon photonic device structure 400 includes a silicon base layer 410, a silicon dioxide middle layer 420 on top of silicon base layer 410, and a silicon top layer 430 on top of silicon dioxide middle layer 420.

Silicon top layer 430 has a pit 440. A bottom 460 of pit 440 is silicon. In some examples, as shown in FIG. 4, bottom 460 of pit 440 is located in silicon base layer 410. In other examples, as shown in FIG. 7, bottom 460 of pit 440 is located in silicon base layer 410. In such examples, pit 440 extends through silicon dioxide middle layer 420 and into silicon base layer 410 such that bottom 460 of pit 440 is in silicon base layer 410. The silicon at bottom 460 of pit 470 should be sufficient to act as a seed layer for growth of more silicon or germanium.

A germanium layer 442 is on top of bottom 460 of pit 440. Germanium layer 442 is grown such that a top 462 of germanium layer 442 is lower than a top 432 of silicon top layer 430. In some examples, germanium layer 442 further comprises germanium conduction layers, as depicted in FIG. 6. As shown, germanium layer 442 may include a first germanium conduction layer 644, a second germanium conduction layer 646, and a germanium absorption layer 645 between the first and second germanium conduction layers 644 and 646.

In other examples, pit 440 may include silicon conduction layers. As shown in FIG. 5, a first silicon conduction layer 544 may be located at the bottom 460 of pit 440. Germanium layer 442 may be located on top of first silicon conduction layer 544 and a second silicon conduction layer 546 may be located on a top 462 of germanium layer 442. A top 564 of second silicon conduction layer 546 is lower than top 432 of silicon top layer 430.

A photonic device material 450 is located on top of silicon top layer 430. Photonic device material 450 comprises the photonic device and is bonded to silicon top layer 430 without planarization of the silicon top layer. The photonic device may be a laser, modulator, or other suitable photonic device. Light may traverse hybrid silicon photonic device structures 400, 500, 600, and 700 in a lateral direction along the x axis or along the z axis, as shown by the arrows labeled "light".

Figure 8:
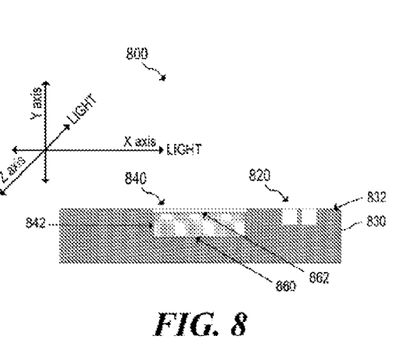
FIGS. 8-9 are block diagrams of cross-sectional views of example hybrid silicon photonic device structures having a photonic device in the silicon layer.
Figure 9:
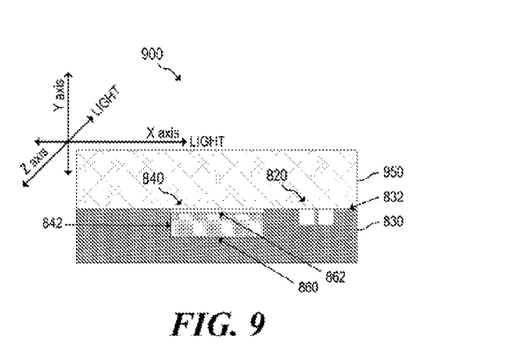

FIGS. 8-9 depict cross-sectional views of example hybrid silicon photonic device structures 800 and 900 that may be produced via the methods described above. In FIG. 8, a hybrid silicon photonic device structure 800 integrates a photodetector and a photonic device on a silicon wafer. Hybrid silicon photonic device structure 800 includes a silicon layer 830. Silicon layer 830 has a pit 840. A bottom 860 of pit 840 is silicon and a germanium layer 842 that comprises the photodetector is at the bottom 860 of pit 840. Germanium layer 842 is grown such that a top 862 of germanium layer 842 is lower than a top 832 of silicon layer 830.

A photonic device 820 is fabricated in silicon layer 830 without planarization of silicon layer 830. In some examples, photonic device 820 is a passive photonic device such as a waveguide, a ring resonator, a grating, a silicon modulator, and the like. Photonic device 820 may be fabricated via chemical etching, mechanical grinding, or any other suitable fabrication process. In some examples, photonic device 820 may be located adjacent to pit 840. In other examples, photonic device 820 and pit 840 may not be located adjacent to one another.

In some examples, as shown in FIG. 9, a photonic device material 950 is located on top 832 of silicon layer 830. Photonic device material 950 comprises a second photonic device such as a laser, an amplifier, a modulator, a resonator, a waveguide, and the like. Photonic device material 950 is bonded to the silicon layer without planarization of the silicon layer. Light may traverse hybrid silicon photonic device structures 800 and 900 in a lateral direction along the x axis or along the z axis, as shown by the arrows labeled "light".

Figure 10:
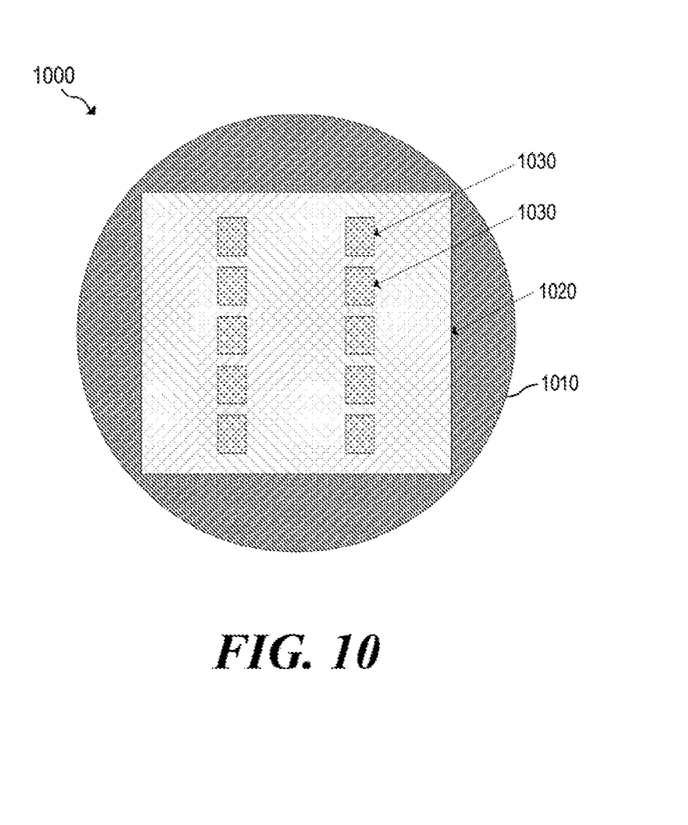
FIG. 10 is a top-down view of an example hybrid silicon photonic device structure having a plurality of photodetectors and a plurality of photonic devices.

In some examples, a hybrid silicon photonic device structure such as those described in FIGS. 1-9 may comprise multiple photodetectors and multiple photonic devices on a single silicon wafer. FIG. 10 depicts an example hybrid silicon photonic device structure 1000 made up of a silicon wafer 1010 having a plurality of photodetectors 1030. Hybrid silicon photonic device structure 1000 further includes photonic device material 1020 that comprises a plurality of photonic devices such that each photodetector 1030 of the plurality of photodetectors corresponds to a photonic device of the plurality of photonic devices. Photonic device material 1020 is bonded to silicon wafer 1010 with a single alignment instead of multiple alignments, one for each bonded photonic device. Bonding multiple photonic devices without planarization and with a single alignment decreases process complexity, fabrication time, and costs.

What is claimed is:

1. A method of integrating a photodetector with a photonic device on a silicon wafer to make a hybrid silicon photonic device structure, the method comprising:
    establishing a dielectric layer on the silicon wafer;
    forming a pit in a portion of the dielectric layer and the silicon wafer, wherein a bottom of the pit is silicon;
    growing a germanium layer in the pit such that a top of the germanium layer is lower than a top of the silicon wafer, wherein the germanium layer comprises the photodetector; and
    bonding a photonic device material that comprises the photonic device to the silicon wafer without planarization of the silicon wafer, wherein bonding the photonic device material further comprises molecular bonding or polymer bonding the photonic device material to the silicon wafer,
    wherein the silicon wafer includes a plurality of photodetectors,
    wherein the photonic device material comprises a plurality of photonic devices such that each photodetector of the plurality of photodetectors corresponds to a photonic device of the plurality of photonic devices, and
    wherein the photonic device material is bonded with a single alignment.

2. The method of claim 1, wherein the silicon wafer comprises a silicon base layer, a silicon dioxide middle layer, and a silicon top layer.

3. The method of claim 2, wherein the bottom of the pit is in the silicon top layer of the silicon wafer.

4. The method of claim 2, wherein the pit extends through the silicon dioxide middle layer and into the silicon base layer, the bottom of the pit being in the silicon base layer of the silicon wafer.

5. The method of claim 1, wherein the photonic device is a laser.

6. The method of claim 1, further comprising:
    establishing a first silicon conduction layer at the bottom of the pit; and establishing a second silicon conduction layer in the pit on top of the germanium layer such that the top of the second silicon conduction layer is lower than the top of the silicon wafer.

7. The method of claim 1, wherein growing the germanium layer further comprises:
establishing a first germanium conduction layer;
establishing a second germanium conduction layer; and
growing a germanium absorption layer, wherein the germanium absorption layer is between the first germanium conduction layer and the second germanium conduction layer.

8. The method of claim 7, wherein establishing the first and second germanium conduction layers includes growing a doped germanium layer or growing the germanium layer and doping a first portion of the germanium layer to form the first germanium conduction layer and doping a second portion of the germanium layer to form the second germanium conduction layer.

9. The method of claim 1, wherein light traverses the hybrid silicon photonic device structure in a lateral direction.

10. A hybrid silicon photonic device structure that integrates a photodetector and a photonic device on a silicon wafer, the hybrid silicon photonic device structure comprising:
a silicon base layer;
a silicon dioxide middle layer on top of the silicon base layer;
a silicon top layer on top of the silicon dioxide middle layer, the silicon top layer having a pit,
wherein a bottom of the pit is silicon, and a germanium layer that comprises the photodetector is on top of the bottom of the pit, and
wherein the germanium layer is grown such that a top of the germanium layer is lower than a top of the silicon top layer, and wherein the germanium layer further comprises:
a first germanium conduction layer;
a second germanium conduction layer; and
a germanium absorption layer, wherein the germanium absorption layer is between the first germanium conduction layer and the second germanium conduction layer; and
a photonic device material that comprises the photonic device, wherein the photonic device material is bonded to the silicon top layer without planarization of the silicon top layer.

11. The hybrid silicon photonic device structure of claim 10, wherein the photonic device is a laser.

12. The hybrid silicon photonic device structure of claim 10, further comprising:
a first silicon conduction layer at the bottom of the pit; and
a second silicon conduction layer in the pit on top of the germanium layer, wherein the top of the second silicon conduction layer is lower than the top of the silicon top layer.

13. The hybrid silicon photonic device structure of claim 10, wherein light traverses the hybrid silicon photonic device structure in a lateral direction.

14. A hybrid silicon photonic device structure that integrates a photodetector and a photonic device on a silicon wafer, the hybrid silicon photonic device structure comprising:
a silicon layer having a pit,
wherein a bottom of the pit is a first silicon conduction layer, and a germanium layer that comprises the photodetector is at the bottom of the pit, and
wherein the germanium layer is grown such that a top of the germanium layer is lower than a top of the silicon layer having the pit;
wherein a second silicon conduction layer is in the pit on top of the germanium layer and the top of the second silicon conduction layer is lower than the top of the silicon layer having the pit; and
the photonic device, wherein the photonic device is fabricated in the silicon layer without planarization of the silicon layer.

15. The hybrid silicon photonic device structure of claim 14, wherein light traverses the hybrid silicon photonic device structure in a lateral direction.

16. The hybrid silicon photonic device structure of claim 14, further comprising:
a photonic device material that comprises a second photonic device, wherein the photonic device material is bonded to the silicon layer without planarization of the silicon layer.

17. A hybrid silicon photonic device structure that integrates a photodetector and a photonic device on a silicon wafer, the hybrid silicon photonic device structure comprising:
a silicon base layer;
a silicon dioxide middle layer on top of the silicon base layer;
a silicon top layer on top of the silicon dioxide middle layer, the silicon top layer having a pit extending through the silicon dioxide middle layer and into the silicon base layer, the bottom of the pit being in the silicon base layer,
wherein a bottom of the pit is silicon, and a germanium layer that comprises the photodetector is on top of the bottom of the pit, and
wherein the germanium layer is grown such that a top of the germanium layer is lower than a top of the silicon top layer; and
a photonic device material that comprises the photonic device, wherein the photonic device material is bonded to the silicon top layer without planarization of the silicon top layer.

18. A method of integrating a photodetector with a photonic device on a silicon wafer to make a hybrid silicon photonic device structure, the method comprising:
establishing a dielectric layer on the silicon wafer;
forming a pit in a portion of the dielectric layer and the silicon wafer, wherein a bottom of the pit is silicon;
growing a germanium layer in the pit such that a top of the germanium layer is lower than a top of the silicon wafer, wherein the germanium layer comprises the photodetector;
removing the dielectric layer before bonding the photonic device; and
bonding a photonic device material that comprises the photonic device to the silicon wafer without planarization of the silicon wafer.

19. The method of claim 18, wherein the pit extends through the silicon dioxide middle layer and into the silicon base layer, the bottom of the pit being in the silicon base layer of the silicon wafer.

20. The method of claim 18, wherein growing the germanium layer further comprises:
establishing a first germanium conduction layer;
establishing a second germanium conduction layer; and growing a germanium absorption layer, wherein the germanium absorption layer is between the first germanium conduction layer and the second germanium conduction layer.

\* \* \* \* \*